US012609588B2

(12) United States Patent
Zhang et al.

(10) Patent No.: US 12,609,588 B2
(45) Date of Patent: Apr. 21, 2026

(54) DUAL EVAPORATION-CONDENSATION CYCLE COOLING DEVICE AND METHOD FOR HIGH-TEMPERATURE SUPERCONDUCTING MOTOR OF HYDROGEN-POWERED AIRCRAFT

(71) Applicant: BEIJING INSTITUTE OF AEROSPACE TESTING TECHNOLOGY, Beijing (CN)

(72) Inventors: Chunwei Zhang, Beijing (CN); Jing Chen, Beijing (CN); Shanfeng Li, Beijing (CN); Jie Qu, Beijing (CN); Pingrui Huang, Beijing (CN); Qizhi Yin, Beijing (CN); Kangna Liu, Beijing (CN); Haishuai Yu, Beijing (CN); Kang Zhao, Beijing (CN); Bowen Zhou, Beijing (CN)

(73) Assignee: BEIJING INSTITUTE OF AEROSPACE TESTING TECHNOLOGY, Beijing (CN)

( * ) Notice: Subject to any disclaimer, the term of this patent is extended or adjusted under 35 U.S.C. 154(b) by 0 days.

(21) Appl. No.: 18/878,138

(22) PCT Filed: Jun. 21, 2023

(86) PCT No.: PCT/CN2023/101628
§ 371 (c)(1),
(2) Date: Dec. 23, 2024

(87) PCT Pub. No.: WO2023/246848
PCT Pub. Date: Dec. 28, 2023

(65) Prior Publication Data
US 2025/0357825 A1     Nov. 20, 2025

(30) Foreign Application Priority Data

Jun. 23, 2022     (CN) ......................... 202210725786.8

(51) Int. Cl.
*H02K 9/20*     (2006.01)
*B64D 33/08*     (2006.01)
(Continued)

(52) U.S. Cl.
CPC ............... *H02K 9/20* (2013.01); *B64D 33/08* (2013.01); *H02K 9/225* (2021.01); *H02K 55/00* (2013.01)

(58) Field of Classification Search
CPC .......... H02K 9/19; H02K 9/20; H02K 9/225; H02K 55/00; H02K 55/02; H02K 55/04; H02K 55/06; B64D 27/34
See application file for complete search history.

(56) References Cited

U.S. PATENT DOCUMENTS

| | | | |
|---|---|---|---|
| 5,806,318 A | 9/1998 | Diiorio et al. | |
| 6,354,087 B1 | 3/2002 | Nakahara et al. | |

FOREIGN PATENT DOCUMENTS

| | | |
|---|---|---|
| CN | 107645212 A | 1/2018 |
| CN | 108352372 A | 7/2018 |

(Continued)

OTHER PUBLICATIONS

Xiaowei Song, et al., Ground Testing of the World's First MW-Class Direct-Drive Superconducting Wind Turbine Generator, IEEE Transactions on Energy Conversion, 2020, pp. 757-764, vol. 35 No.2.

(Continued)

*Primary Examiner* — Eric Johnson
(74) *Attorney, Agent, or Firm* — Bayramoglu Law Offices LLC

(57) ABSTRACT

A cooling device and method for a high-temperature superconducting motor of a hydrogen-powered aircraft based on a dual evaporation-condensation cycle is provided. The latent heat of vaporization of liquid hydrogen fuel in the hydrogen-powered aircraft is used as the cooling source of (Continued)

the superconducting motor. The internal evaporation-condensation cycle can meet the cooling requirements of the superconducting motor during normal operation, and the external evaporation-condensation cycle can be used as a supplement to the cooling capacity of the device when the internal evaporation-condensation cycle is damaged or cannot meet the requirements. The coupling of the two effectively increases the adaptability of the cooling device to complex environments. When the supply of the liquid hydrogen is interrupted for a short time, the liquid nitrogen absorbs the heat of the high-temperature superconducting motor and vaporizes, ensuring the continuous operation of the high-temperature superconducting motor in extreme environments.

12 Claims, 1 Drawing Sheet

(51) Int. Cl.
H02K 9/22 (2006.01)
H02K 55/00 (2006.01)

(56) References Cited

FOREIGN PATENT DOCUMENTS

| | | | | | |
|---|---|---|---|---|---|
| CN | 207881304 | U | | 9/2018 | |
| CN | 111627640 | A | | 9/2020 | |
| CN | 113422436 | A | | 9/2021 | |
| CN | 114156512 | A | | 3/2022 | |
| CN | 115333329 | A | | 11/2022 | |
| DE | 4029443 | A1 | | 5/1991 | |
| EP | 1134754 | A1 | | 9/2001 | |
| GB | 2620438 | A | * | 1/2024 | ............ H01M 8/249 |
| WO | WO-2020079419 | A1 | * | 4/2020 | ............ B64C 39/00 |
| WO | WO-2024009088 | A1 | * | 1/2024 | ............ H01M 8/249 |

OTHER PUBLICATIONS

Yangfang Bi, et al., Cryogenic Cooling Systems and Chillers for High Temperature Superconducting Power Applications, Science China Press, 2013, pp. 1101-1111, vol. 43 No. 10.

* cited by examiner

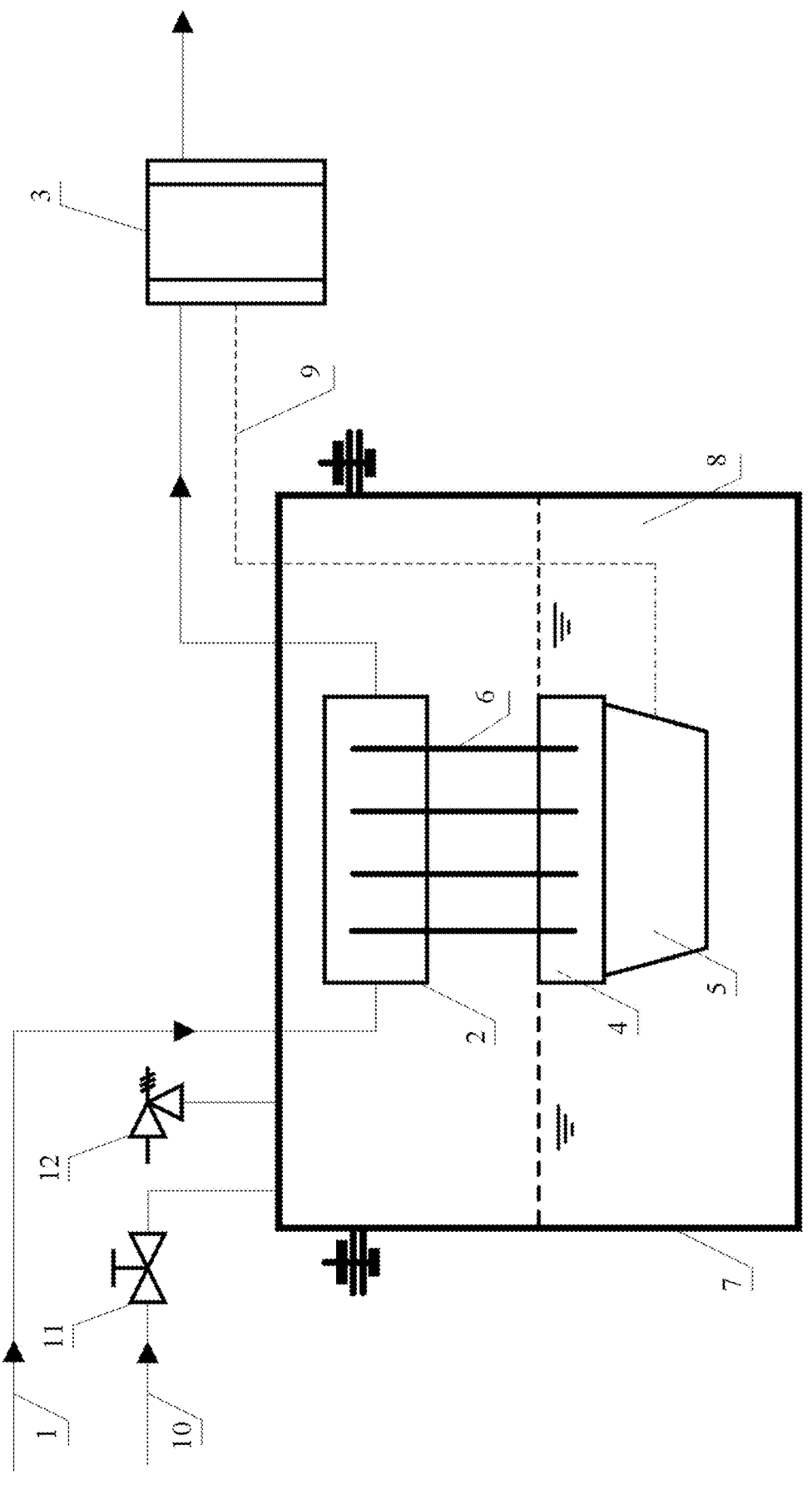

1

DUAL EVAPORATION-CONDENSATION CYCLE COOLING DEVICE AND METHOD FOR HIGH-TEMPERATURE SUPERCONDUCTING MOTOR OF HYDROGEN-POWERED AIRCRAFT

CROSS REFERENCE TO THE RELATED APPLICATIONS

This application is the national phase entry of International Application No. PCT/CN2023/101628, filed on Jun. 21, 2023, which is based upon and claims priority to Chinese Patent Application No. 202210725786.8, filed on Jun. 23, 2022, the entire contents of which are incorporated herein by reference.

TECHNICAL FIELD

The invention relates to the technical field of cooling of superconducting motors, and in particular to a cooling device and method for a high-temperature superconducting motor of a hydrogen-powered aircraft based on a dual evaporation-condensation cycle.

BACKGROUND

With the rapid promotion of Chinese dual-carbon policy, hydrogen energy has become an important clean energy with its zero carbon emissions and high energy density. In the field of aviation transportation, hydrogen-powered aircrafts using liquid hydrogen as fuel have become the key layout direction of Chinese future, which is of great significance to the reduction of carbon emissions in the aviation transportation industry. Hydrogen-powered aircrafts will adopt a hybrid electric drive architecture based on hydrogen turbine engines, which will be more diversified in form, and more convenient when combined with high-power fuel cells, high-temperature superconducting electric drive, and other emerging technologies.

Cryogenic technology is the key technology for the application of hydrogen-powered aircrafts. On one hand, it is necessary to build a liquid hydrogen fuel lossless storage technology system to extend the storage time of liquid hydrogen. On the other hand, high-temperature superconducting motors in the hydrogen-powered aircrafts need to operate in a low-temperature environment to maximize the output power. The traditional high-temperature superconducting motor cooling solution mainly relies on low-temperature coolers or vaporized low-temperature media (immersion cooling) to provide the cooling capacity, which is not suitable for the application environment on the hydrogen-powered aircrafts.

SUMMARY

An objective of the present invention is to provide a cooling device for a superconducting motor of a hydrogen-powered aircraft based on a dual evaporation-condensation cycle, using liquid hydrogen fuel in the hydrogen-powered aircraft as the cooling source of the superconducting motor, designing a dual evaporation and condensation heat transfer structure to achieve efficient transfer of the cooling capacity from the liquid hydrogen to the superconducting motor, and ensuring the operation environment of the high-temperature superconducting motor.

The present invention intends to achieve the objective of the present invention with the following technical solutions:

In the first aspect, the present invention provides a cooling device for a high-temperature superconducting motor of a hydrogen-powered aircraft based on a dual evaporation-condensation cycle, including a liquid hydrogen pipeline, a liquid nitrogen pipeline, a fuel cell, an insulated dewar, a low-temperature heat pipe, a liquid hydrogen heat exchanger, and a high-temperature superconducting motor, where the low-temperature heat pipe, the liquid hydrogen heat exchanger, and the high-temperature superconducting motor are built in the insulated dewar. The liquid hydrogen pipeline is connected to the liquid hydrogen heat exchanger and the fuel cell in sequence, and is configured to provide a cooling capacity for the liquid hydrogen heat exchanger and the fuel cell. The liquid nitrogen pipeline is connected to a low-temperature stop valve and the insulated dewar in sequence, and is configured to fill the insulated dewar with liquid nitrogen medium. The insulated dewar is externally connected to a safety valve through a pipeline, and is configured to release an internal overpressure nitrogen gas. A high-temperature superconducting motor body is provided with a cooling end, and the high-temperature superconducting motor cooling end and the high-temperature superconducting motor body are both immersed in the liquid nitrogen medium. An evaporation section and a condensation section of the low-temperature heat pipe are respectively connected to the high-temperature superconducting motor cooling end and the liquid hydrogen heat exchanger, thereby forming an internal evaporation and condensation cycle. The liquid hydrogen heat exchanger is located above a liquid level of the liquid nitrogen, and the outside of the liquid hydrogen heat exchanger is not subjected to heat insulation treatment, so that the nitrogen gas rising due to heat evaporation is allowed to be directly cooled, re-condensed into the liquid nitrogen and refluxed, thereby forming an external evaporation and condensation cycle. The high-temperature superconducting motor body is connected to the fuel cell through a cable and is powered by the fuel cell.

Preferably, the low-temperature heat pipe is divided into three parts including the evaporation section, an insulation section and the condensation section, and except for the evaporation section and the condensation section that are respectively connected to the high-temperature superconducting motor cooling end and the liquid hydrogen heat exchanger, the rest of the low-temperature heat pipe is the insulation section.

Preferably, a joint between the low-temperature heat pipe and the high-temperature superconducting motor cooling end and a joint between the low-temperature heat pipe and the liquid hydrogen heat exchanger are both designed in an integrated manner to minimize a contact thermal resistance.

Preferably, the low-temperature heat pipe adopts a pulsating heat pipe suitable for a liquid hydrogen temperature zone.

Preferably, the liquid level of the liquid nitrogen inside the insulated dewar does not exceed the insulation section of the low-temperature heat pipe.

Preferably, a working medium in the liquid hydrogen pipeline comes from a liquid hydrogen fuel in the hydrogen-powered aircraft.

In the second aspect, the present invention provides a cooling method for a high-temperature superconducting motor of a hydrogen-powered aircraft using any cooling device as described in the first aspect, including: opening the low-temperature stop valve in advance, and injecting liquid nitrogen into the insulated dewar through the liquid nitrogen pipeline to soak the high-temperature superconducting motor cooling end and the high-temperature superconducting motor body; starting the fuel cell to operate, where generated electric energy drives the high-temperature superconducting motor body to work through the cable, and heat generated during a working process is transferred to the high-temperature superconducting motor cooling end; and during an operation of the high-temperature superconducting motor, adopting three operation modes according to different working conditions:

under a normal working condition, the heat inside the high-temperature superconducting motor cooling end is transferred to the liquid hydrogen heat exchanger through the evaporation and condensation cycle inside the low-temperature heat pipe; and the liquid hydrogen fuel enters the liquid hydrogen heat exchanger through the liquid hydrogen pipeline, absorbs the heat transferred by the low-temperature heat pipe and vaporizes, and then continues to cool the fuel cell to improve a power generation efficiency of the fuel cell;

when the low-temperature heat pipe is damaged or the power of the high-temperature superconducting motor body increases suddenly, the heat inside the high-temperature superconducting motor cooling end is transferred to the liquid hydrogen heat exchanger through the evaporation and condensation cycle inside the low-temperature heat pipe; however, the low-temperature heat pipe is unable to meet a heat dissipation requirement of the high-temperature superconducting motor cooling end, at this time, the liquid nitrogen absorbs extra heat of the high-temperature superconducting motor and vaporizes, then rises to a gas phase space, condenses into the liquid nitrogen after contacting the liquid hydrogen heat exchanger, and merges into the lower liquid nitrogen under the action of gravity; and the liquid hydrogen fuel enters the liquid hydrogen heat exchanger through the liquid hydrogen pipeline, absorbs the heat transferred by the low-temperature heat pipe and vaporizes, and then continues to cool the fuel cell to improve the power generation efficiency of the fuel cell; and when the supply of the liquid hydrogen is interrupted, the liquid nitrogen in the highly insulated dewar absorbs the heat of the high-temperature superconducting motor and vaporizes rapidly, ensuring that the high-temperature superconducting motor cooling end and the high-temperature superconducting motor body are both in a required working temperature range, and after the pressure inside the highly insulated dewar rises rapidly to exceed a pressure threshold, the overpressure nitrogen gas is discharged through the safety valve.

Compared with the prior art, the present invention has the following outstanding and beneficial technical effects: the latent heat of vaporization of liquid hydrogen fuel in the hydrogen-powered aircraft is used as the cooling source of the superconducting motor, avoiding the problems of power consumption, weight and complexity caused by the use of low-temperature coolers. The internal evaporation-condensation cycle can meet the cooling requirements of the superconducting motor during normal operation, and the external evaporation-condensation cycle can be used as a supplement to the cooling capacity of the device when the internal evaporation-condensation cycle is damaged or cannot meet the requirements. The coupling of the two effectively increases the adaptability of the cooling device to complex environments. When the supply of the liquid hydrogen is interrupted for a short time, the liquid nitrogen absorbs the heat of the high-temperature superconducting motor and vaporizes, ensuring the continuous operation of the high-temperature superconducting motor in extreme environments.

The concept, specific structure, and technical effects of the present invention will be further explained below in conjunction with the drawings to fully understand the objectives, features, and effects of the present invention.

BRIEF DESCRIPTION OF THE DRAWINGS

FIGURE is a schematic diagram showing the structure of a cooling device for a high-temperature superconducting motor of a hydrogen-powered aircraft based on a dual evaporation-condensation cycle according to the present invention.

In the FIGURE: liquid hydrogen pipeline 1, liquid hydrogen heat exchanger 2, fuel cell 3, high-temperature superconducting motor cooling end 4, high-temperature superconducting motor body 5, low-temperature heat pipe 6, insulated dewar 7, liquid nitrogen 8, cable 9, liquid nitrogen pipeline 10, low-temperature stop valve 11, and safety valve 12.

DETAILED DESCRIPTION OF THE EMBODIMENTS

In order to make the above-mentioned objectives, features, and advantages of the present invention more apparent and easier to understand, the specific implementations of the present invention are described in detail below in conjunction with the drawings. In the following description, many specific details are set forth to facilitate the full understanding of the present invention. However, the present invention can be implemented in many other ways different from those described herein, and those skilled in the art can make similar improvements without violating the connotation of the present invention, so the present invention is not limited by the specific embodiments disclosed below. The technical features in each embodiment of the present invention can be combined on the premise that they do not conflict with each other.

In the description of the present invention, it should be understood that when an element is considered to be "connected" to another element, it can be directly connected to another element or indirectly connected, that is, there is an intermediate element. On the contrary, when an element is called "directly" connected to another element, there is no intermediate element.

As shown in the FIGURE, in a preferred embodiment of the present invention, a cooling device for a high-temperature superconducting motor of a hydrogen-powered aircraft based on a dual evaporation-condensation cycle is provided, including the liquid hydrogen pipeline 1, the liquid hydrogen heat exchanger 2, the fuel cell 3, the high-temperature superconducting motor cooling end 4, the high-temperature superconducting motor body 5, the low-temperature heat pipe 6, the highly insulated dewar 7, the liquid nitrogen 8, the cable 9, the liquid nitrogen pipeline 10, the low-temperature stop valve 11, and the safety valve 12. The specific connection form and working principle of each component in the cooling device are described in detail below.

The liquid hydrogen pipeline 1 and the liquid nitrogen pipeline 10 are configured to input a liquid hydrogen working medium and a liquid nitrogen working medium into the cooling device respectively. Specifically, the working medium in the liquid hydrogen pipeline 1 comes from the liquid hydrogen fuel in the hydrogen-powered aircraft, and the working medium in the liquid nitrogen pipeline 10 can be additionally added to the hydrogen-powered aircraft.

The liquid hydrogen pipeline 1 is connected to the liquid hydrogen heat exchanger 2 and the fuel cell 3 in sequence, and the liquid hydrogen working medium inside the liquid hydrogen pipeline 1 can flow into the liquid hydrogen heat exchanger 2 and the fuel cell 3 in sequence, and provide the cooling capacity for the liquid hydrogen heat exchanger 2 and the fuel cell 3 through the latent heat of vaporization of the liquid hydrogen. The liquid nitrogen pipeline 10 is connected to the low-temperature stop valve 11 and the insulated dewar 7 in sequence, and is configured to fill the insulated dewar 7 with the liquid nitrogen medium. The filling process of the liquid nitrogen can be adjusted by opening and closing the low-temperature stop valve 11 on the liquid nitrogen pipeline 10.

The entire insulated dewar 7 should be kept airtight, and a highly insulated dewar with the best possible insulation performance should be adopted. Since there is the liquid nitrogen inside the insulated dewar 7, in order to prevent the internal pressure from being excessively high and causing danger, the safety valve 12 for ensuring the safety of the internal pressure is provided on the insulated dewar 7. The inner cavity of the insulated dewar 7 is externally connected to the safety valve 12 through a pipeline. When the pressure in the inner cavity exceeds a safety range, the internal overpressure nitrogen gas can be released by opening the safety valve 12.

The high-temperature superconducting motor of the hydrogen-powered aircraft will release a large amount of heat during operation, so low-temperature cooling is required. The high-temperature superconducting motor can be divided into a main body for providing a driving power and a cooling end installed on the main body for heat dissipation and cooling of the main body, which are respectively called the high-temperature superconducting motor cooling end 4 and the high-temperature superconducting motor body 5. In order to ensure the heat dissipation effect, when the liquid nitrogen 8 medium is filled into the insulated dewar 7 through the liquid nitrogen pipeline 10, the liquid level of the liquid nitrogen 8 needs to be ensured to be higher than the high-temperature superconducting motor cooling end 4 and the high-temperature superconducting motor body 5, so that the high-temperature superconducting motor cooling end 4 and the high-temperature superconducting motor body 5 are both immersed in the liquid nitrogen 8 medium.

In the cooling device for the high-temperature superconducting motor of the hydrogen-powered aircraft, in order to ensure the stable and reliable operation environment of the high-temperature superconducting motor, a dual evaporation and condensation heat transfer structure is designed to achieve efficient transfer of the cooling capacity from the liquid hydrogen to the superconducting motor.

On one hand, the low-temperature heat pipe 6 including an evaporation section, an insulation section and a condensation section is arranged between the high-temperature superconducting motor cooling end 4 and the liquid hydrogen heat exchanger 2, and the evaporation section and the condensation section are located at both ends of the low-temperature heat pipe 6. The evaporation section and the condensation section of the low-temperature heat pipe 6 are respectively connected to the high-temperature superconducting motor cooling end 4 and the liquid hydrogen heat exchanger 2. The high-temperature superconducting motor cooling end 4 and the liquid hydrogen heat exchanger 2 can realize efficient energy transfer therebetween through evaporation-condensation of the working medium inside the low-temperature heat pipe 6, thereby forming an internal evaporation-condensation cycle. The internal evaporation-condensation cycle is mainly used to meet the cooling requirements of the high-temperature superconducting motor during operation under a normal working condition.

On the other hand, during the operation of the hydrogen-powered aircraft, abnormal working conditions may occur due to various factors, including damage on the low-temperature heat pipe 6, or a sudden increase in the power of the high-temperature superconducting motor body 5, and a short-time interruption of the supply of the liquid hydrogen. These abnormal working conditions may cause the high-temperature superconducting motor to be unable to quickly dissipate heat through the low-temperature heat pipe 6, and a part of the heat is accumulated in the high-temperature superconducting motor. Therefore, in the present invention, the liquid hydrogen heat exchanger 2 is arranged above the liquid level of the liquid nitrogen 8, and the outside of the liquid hydrogen heat exchanger 2 is not subjected to insulation treatment, so that the nitrogen gas rising due to heat evaporation can be directly cooled, re-condensed into the liquid nitrogen 8 and refluxed to the lower liquid phase working medium area, thereby forming an external evaporation and condensation cycle. In this external evaporation and condensation cycle, if heat accumulation occurs in the high-temperature superconducting motor cooling end 4 and the high-temperature superconducting motor body 5, since the two are immersed in the liquid nitrogen 8, their heat can be quickly absorbed by the liquid nitrogen 8, and the liquid nitrogen 8 enters the gas phase space after vaporization. If the liquid hydrogen heat exchanger 2 can still work normally, since the outside of the liquid hydrogen heat exchanger 2 is not subjected to insulation treatment, the nitrogen gas will be recondensed and refluxed at the low-temperature of the liquid hydrogen; if the liquid hydrogen heat exchanger 2 cannot work normally due to reasons such as the interruption of the supply of the liquid hydrogen, the nitrogen gas will be discharged from the safety valve 12 after accumulating to a certain pressure.

In addition, the power supply of the high-temperature superconducting motor body 5 can be provided by the fuel cell 3, and the high-temperature superconducting motor body 5 can be connected to the fuel cell 3 through the cable 9 to obtain power. Under the condition of normal supply of the liquid hydrogen, the liquid hydrogen fuel enters the liquid hydrogen heat exchanger 2 through the liquid hydrogen pipeline 1, absorbs the heat transferred by the low-temperature heat pipe 6 and vaporizes, and can continue to, after vaporization, cool the fuel cell 3, so as to reduce the working temperature of the fuel cell 3 and improve the power generation efficiency of the fuel cell 3.

In addition, except for the evaporation section and the condensation section that are respectively connected to the high-temperature superconducting motor cooling end 4 and the liquid hydrogen heat exchanger 2, the rest of the low-temperature heat pipe 6 is the insulation section to ensure the internal insulation performance. At the same time, in order to minimize the contact thermal resistance, the joint between the aforementioned low-temperature heat pipe 6 and the liquid hydrogen heat exchanger 2 and the joint between the aforementioned low-temperature heat pipe 6 and the high-temperature superconducting motor cooling end 4 are preferably designed in an integrated manner. In order to reduce the impact of the shaking of the hydrogen-powered aircraft on the heat transfer performance of the heat pipe, the low-temperature heat pipe 6 can adopt a pulsating heat pipe suitable for the liquid hydrogen temperature zone.

In addition, the liquid hydrogen heat exchanger 2 needs to be a certain distance higher than the liquid level of the liquid nitrogen 8, and can generally be provided at the top of the inner cavity of the insulated dewar 7. Moreover, the liquid level of the liquid nitrogen 8 inside the insulated dewar 7 should not exceed the insulation section of the low-temperature heat pipe 6 to prevent the liquid nitrogen 8 from affecting the operation of the low-temperature heat pipe 6.

Based on the cooling device shown in the FIGURE, the present invention can further provide a cooling method for a high-temperature superconducting motor of a hydrogen-powered aircraft using a dual evaporation-condensation cycle, which sets three different operation modes according to different working conditions of the high-temperature superconducting motor. Specifically, the operation mode I is adopted when the high-temperature superconducting motor is in a normal operation state and the liquid hydrogen is normally supplied, the operation mode II is adopted when the liquid hydrogen is normally supplied but the low-temperature heat pipe 6 is unable to meet the heat dissipation requirement of the high-temperature superconducting motor cooling end 4, and the operation mode III is adopted when the supply of the liquid hydrogen is interrupted for a short time. The three operation modes are implemented as follows:

(1) Operation mode I: The liquid nitrogen 8 enters the highly insulated dewar 7 through the liquid nitrogen pipeline 10 and the low-temperature stop valve 11, and soaks the high-temperature superconducting motor cooling end 4 and the high-temperature superconducting motor body 5. The fuel cell 3 starts to operate, and the generated electricity drives the high-temperature superconducting motor body 5 to work through the cable 9. The heat generated during the working process is transferred to the high-temperature superconducting motor cooling end 4, and the high-temperature superconducting motor operates normally. The heat inside the high-temperature superconducting motor cooling end 4 is transferred to the liquid hydrogen heat exchanger 2 through the evaporation and condensation cycle inside the low-temperature heat pipe 6. The liquid hydrogen fuel enters the liquid hydrogen heat exchanger 2 through the liquid hydrogen pipeline 1, absorbs the heat transferred by the low-temperature heat pipe and vaporizes, and then continues to cool the fuel cell 3 to improve the power generation efficiency of the fuel cell 3.

(2) Operation mode II: The liquid nitrogen 8 enters the highly insulated dewar 7 through the liquid nitrogen pipeline 10 and the low-temperature stop valve 11, and soaks the high-temperature superconducting motor cooling end 4 and the high-temperature superconducting motor body 5. The fuel cell 3 starts to operate, and the generated electricity drives the high-temperature superconducting motor body 5 to work through the cable 9. The heat generated during the working process is transferred to the high-temperature superconducting motor cooling end 4, and the high-temperature superconducting motor operates normally. The heat inside the high-temperature superconducting motor cooling end 4 is transferred to the liquid hydrogen heat exchanger 2 through the evaporation and condensation cycle inside the low-temperature heat pipe 6. When the low-temperature heat pipe 6 is damaged or the power of the high-temperature superconducting motor body 5 increases suddenly, the low-temperature heat pipe 6 is unable to meet the heat dissipation requirement of the high-temperature superconducting motor cooling end 4, and the liquid nitrogen 8 absorbs heat and vaporizes, then rises to the gas phase space, condenses into the liquid nitrogen after contacting the liquid hydrogen heat exchanger 2, and merges into the lower liquid nitrogen 8 under the action of gravity. The liquid hydrogen fuel enters the liquid hydrogen heat exchanger 2 through the liquid hydrogen pipeline 1, absorbs the heat transferred by the low-temperature heat pipe and vaporizes, and then continues to cool the fuel cell 3 to improve the power generation efficiency of the fuel cell 3.

(3) Operation mode III: The liquid nitrogen enters the highly insulated dewar 7 through the liquid nitrogen pipeline 10 and the low-temperature stop valve 11, and soaks the high-temperature superconducting motor cooling end 4 and the high-temperature superconducting motor body 5. The fuel cell 3 starts to operate, and the generated electricity drives the high-temperature superconducting motor body 5 to work through the cable 9. The heat generated during the working process is transferred to the high-temperature superconducting motor cooling end 4, and the high-temperature superconducting motor operates normally. When the supply of the liquid hydrogen is interrupted for a short time, the liquid nitrogen 8 in the highly insulated dewar 7 absorbs the heat of the high-temperature superconducting motor and vaporizes rapidly, ensuring that the high-temperature superconducting motor cooling end 4 and the high-temperature superconducting motor body 5 are both in the preset reasonable working temperature range. Subsequently, the pressure inside the highly insulated dewar 7 rises rapidly, and the overpressure nitrogen gas can be discharged through the safety valve 12.

The above is only a preferred specific implementation of the present invention, but the scope and protection of the present invention is not limited thereto. Any changes or substitutions that can be easily thought of by those skilled in the art within the technical scope disclosed by the present invention should be included in the scope and protection of the present invention. Therefore, the scope and protection of the present invention should be based on the scope of the claims.

What is claimed is:

1. A cooling device for a high-temperature superconducting motor of a hydrogen-powered aircraft based on a dual evaporation-condensation cycle, comprising a liquid hydrogen pipeline, a liquid nitrogen pipeline, a fuel cell, an insulated dewar, a low-temperature heat pipe, a liquid hydrogen heat exchanger, and a high-temperature superconducting motor, wherein the low-temperature heat pipe, the liquid hydrogen heat exchanger, and the high-temperature superconducting motor are built in the insulated dewar; and the liquid hydrogen pipeline is connected to the liquid hydrogen heat exchanger and the fuel cell in sequence, and is configured to provide a cooling capacity for the liquid hydrogen heat exchanger and the fuel cell; the liquid nitrogen pipeline is connected to a low-temperature stop valve and the insulated dewar in sequence, and is configured to fill the insulated dewar with liquid nitrogen medium; the insulated dewar is externally connected to a safety valve through a pipeline, and is configured to release an internal overpressure nitrogen gas; a high-temperature superconducting motor body is provided with a cooling end, and the high-temperature superconducting motor cooling end and the high-temperature superconducting motor body are both immersed in the liquid nitrogen medium; an evaporation section and a condensation section of the low-temperature heat pipe are respectively connected to the high-temperature superconducting motor cooling end and the liquid hydrogen heat exchanger, thereby forming an internal evaporation and condensation cycle; the liquid hydrogen heat exchanger is located above a liquid level of the liquid nitrogen, and an outside of the liquid hydrogen heat exchanger is not subjected to a heat insulation treatment, so that a nitrogen gas rising due to heat evaporation is allowed to be directly cooled, re-condensed into the liquid nitrogen and refluxed, thereby forming an external evaporation and condensation cycle; and the high-temperature superconducting motor body is connected to the fuel cell through a cable and is powered by the fuel cell.

2. The cooling device for the high-temperature superconducting motor of the hydrogen-powered aircraft based on the dual evaporation-condensation cycle according to claim 1, wherein the low-temperature heat pipe is divided into three parts comprising the evaporation section, an insulation section and the condensation section, and except for the evaporation section and the condensation section that are respectively connected to the high-temperature superconducting motor cooling end and the liquid hydrogen heat exchanger, a rest of the low-temperature heat pipe is the insulation section.

3. The cooling device for the high-temperature superconducting motor of the hydrogen-powered aircraft based on the dual evaporation-condensation cycle according to claim 1, wherein a joint between the low-temperature heat pipe and the high-temperature superconducting motor cooling end and a joint between the low-temperature heat pipe and the liquid hydrogen heat exchanger are both designed in an integrated manner to minimize a contact thermal resistance.

4. The cooling device for the high-temperature superconducting motor of the hydrogen-powered aircraft based on the dual evaporation-condensation cycle according to claim 1, wherein the low-temperature heat pipe adopts a pulsating heat pipe suitable for a liquid hydrogen temperature zone.

5. The cooling device for the high-temperature superconducting motor of the hydrogen-powered aircraft based on the dual evaporation-condensation cycle according to claim 1, wherein the liquid level of the liquid nitrogen inside the insulated dewar does not exceed an insulation section of the low-temperature heat pipe.

6. The cooling device for the high-temperature superconducting motor of the hydrogen-powered aircraft based on the dual evaporation-condensation cycle according to claim 1, wherein a working medium in the liquid hydrogen pipeline comes from a liquid hydrogen fuel in the hydrogen-powered aircraft.

7. A cooling method for a high-temperature superconducting motor of a hydrogen-powered aircraft using the cooling device according to claim 1, comprising: opening the low-temperature stop valve in advance, and injecting the liquid nitrogen into the insulated dewar through the liquid nitrogen pipeline to soak the high-temperature superconducting motor cooling end and the high-temperature superconducting motor body; starting the fuel cell to operate, wherein generated electric energy drives the high-temperature superconducting motor body to work through the cable, and heat generated during a working process is transferred to the high-temperature superconducting motor cooling end; and during an operation of the high-temperature superconducting motor, adopting three operation modes according to different working conditions:

wherein under a normal working condition, the heat inside the high-temperature superconducting motor cooling end is transferred to the liquid hydrogen heat exchanger through the evaporation and condensation cycle inside the low-temperature heat pipe; and a liquid hydrogen fuel enters the liquid hydrogen heat exchanger through the liquid hydrogen pipeline, absorbs the heat transferred by the low-temperature heat pipe and vaporizes, and then continues to cool the fuel cell to improve a power generation efficiency of the fuel cell;

wherein when the low-temperature heat pipe is damaged or a power of the high-temperature superconducting motor body increases suddenly, the heat inside the high-temperature superconducting motor cooling end is transferred to the liquid hydrogen heat exchanger through the evaporation and condensation cycle inside the low-temperature heat pipe; however, the low-temperature heat pipe is unable to meet a heat dissipation requirement of the high-temperature superconducting motor cooling end, at this time, the liquid nitrogen absorbs extra heat of the high-temperature superconducting motor and vaporizes, then rises to a gas phase space, condenses into the liquid nitrogen after contacting the liquid hydrogen heat exchanger, and merges into the lower liquid nitrogen under an action of gravity; and the liquid hydrogen fuel enters the liquid hydrogen heat exchanger through the liquid hydrogen pipeline, absorbs the heat transferred by the low-temperature heat pipe and vaporizes, and then continues to cool the fuel cell to improve the power generation efficiency of the fuel cell; and wherein when a supply of the liquid hydrogen is interrupted, the liquid nitrogen in the highly insulated dewar absorbs the heat of the high-temperature superconducting motor and vaporizes rapidly, ensuring that the high-temperature superconducting motor cooling end and the high-temperature superconducting motor body are both in a required working temperature range, and after a pressure inside the highly insulated dewar rises rapidly to exceed a pressure threshold, the overpressure nitrogen gas is discharged through the safety valve.

8. The cooling method according to claim 7, wherein in the cooling device, the low-temperature heat pipe is divided into three parts comprising the evaporation section, an insulation section and the condensation section, and except for the evaporation section and the condensation section that are respectively connected to the high-temperature superconducting motor cooling end and the liquid hydrogen heat exchanger, a rest of the low-temperature heat pipe is the insulation section.

9. The cooling method according to claim 7, wherein in the cooling device, a joint between the low-temperature heat pipe and the high-temperature superconducting motor cooling end and a joint between the low-temperature heat pipe and the liquid hydrogen heat exchanger are both designed in an integrated manner to minimize a contact thermal resistance.

10. The cooling method according to claim 7, wherein in the cooling device, the low-temperature heat pipe adopts a pulsating heat pipe suitable for a liquid hydrogen temperature zone.

11. The cooling method according to claim 7, wherein in the cooling device, the liquid level of the liquid nitrogen inside the insulated dewar does not exceed an insulation section of the low-temperature heat pipe.

12. The cooling method according to claim 7, wherein in the cooling device, a working medium in the liquid hydrogen pipeline comes from the liquid hydrogen fuel in the hydrogen-powered aircraft.

\* \* \* \* \*